Jan. 14, 1936.  L. S. GUNDERMAN  2,027,424
BRAKE RELEASE CONTROL MECHANISM FOR VEHICLES
Filed April 14, 1931
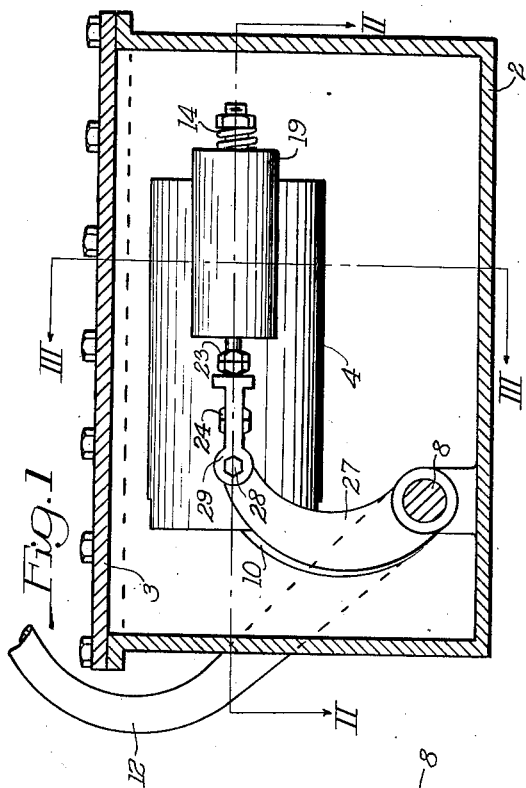
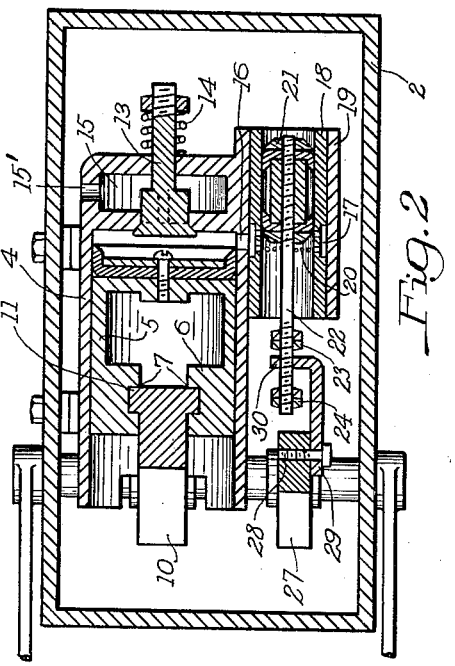
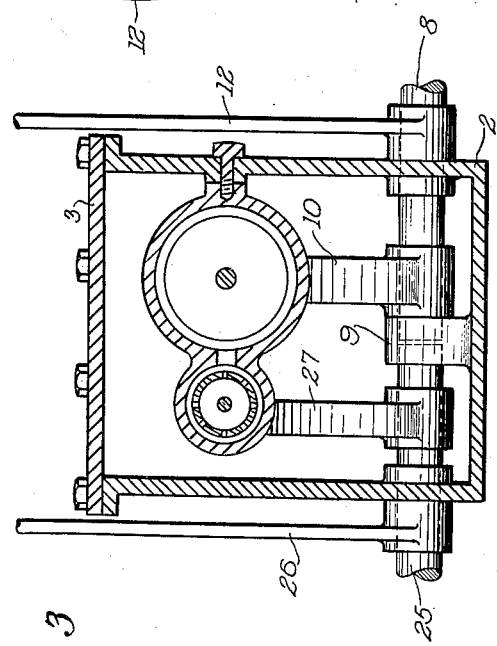
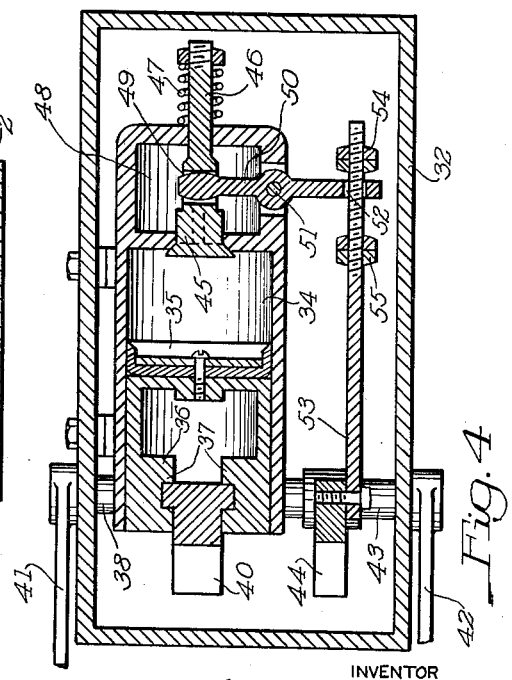
INVENTOR
Lester S. Gunderman
by his attorneys Patented Jan. 14, 1936

2,027,424

UNITED STATES PATENT OFFICE 2,027,424

BRAKE RELEASE CONTROL MECHANISM FOR VEHICLES

Lester S. Gunderman, Pittsburgh, Pa., assignor to Wagner Electric Corporation, St. Louis, Mo., a corporation of Delaware Application April 14, 1931, Serial No. 530,010

8 Claims. (Cl. 192—13)

This invention pertains to means for controlling the releasing action of a brake, and is especially adapted for motor vehicles wherein there is a clutch pedal and a brake pedal, and it provides an arrangement wherein the release of the brake may be controlled through the operation of the clutch from a declutched to a driving position.

The invention constitutes an improvement over the invention disclosed in my Patent No. 1,657,356, dated January 24, 1928.

In my said patent I have shown a fluid pressure system operatively attached to the clutch and brake pedals of an automobile. The mechanism comprises a fluid pressure cylinder having a piston therein, which piston is operatively connected to the brake pedal. A check valve is provided by means of which the piston may be moved in one direction without any substantial resistance from the fluid which fills the cylinder. The check valve, however, confines the flow of fluid in such manner that the piston cannot move in the opposite direction because of the resistance which the confined fluid provides.

A by-pass is provided for releasing the confined fluid, and a valve element connected with the clutch pedal controls the flow of fluid through this by-pass, the arrangement being such that when the clutch pedal is depressed to the declutching position the brake cannot be released, but as the clutch pedal returns to its normal driving position the valve in the by-pass is moved to relieve the confined fluid in the cylinder and thereby allow the brake to release. The arrangement specifically shown in said patent is one wherein the fluid which is used in the system, preferably oil, is confined to the cylinder and the by-pass.

The present invention consitutes an improvement over the arrangement shown in said patent in that it provides a reservoir for the fluid which is external to the cylinder. Through the provision of this reservoir a greater quantity of oil or other fluid can be employed than that actually necessary to fill the cylinder. Consequently, there is little likelihood of the mechanism failing to work through there being an insufficient supply of oil in the cylinder; there is less likelihood of loss of oil; and the entire structure is materially simplified and the cost thereof considerably reduced. Moreover, the present invention provides a construction which will operate more freely.

The invention may be readily understood by reference to the accompanying drawing in which Figure 1 represents a longitudinal section through the casing which provides an oil reservoir, showing the cylinder and valve mechanism in elevation therein;

Figure 2 is a horizontal section in the plane of line II—II of Figure 1;

Figure 3 is a transverse vertical section in the plane of line III—III of Figure 1; and Figure 4 is a view similar to Figure 2 of a slightly modified arrangement.

It will of course be understood that the drawing is merely illustrative of one embodiment of my invention and that the invention is not to be limited to the particular construction and arrangement specifically disclosed.

In the drawing, 2 designates a metal casing or box having a removable cover 3 bolted thereon. Rigidly mounted within the casing 2 is a cylinder 4 in which is a piston 5. This piston has a rearwardly extending operating yoke 6 with vertically slotted end portions 7 thereon. Extending into the box 2 from one side thereof is a shaft 8, the inner end of this shaft being supported in a bearing lug 9. Keyed or otherwise secured to the shaft 8 is a curved arm 10. The upper end of this arm has round transverse projections 11 thereon, these transverse projections engaging in the vertical slots in the portions 7 of the piston operating yoke. The shaft 8 corresponds to the rock shaft on which the brake pedal of a motor vehicle is secured. The shank of the brake pedal is designated 12.

The arrangement is such that when the brake pedal 12 is pushed down in the operation of applying the brake, the arm 10 is rocked to move the piston 5, shown in Figure 2, toward the left. At one end of the cylinder is an inwardly opening check valve 13 with a spring 14 for normally urging it closed.

The casing 2 is filled with oil or other suitable fluid, and it will be seen that when the brake pedal 12 is depressed and the piston 5 moved toward the left as viewed in Figure 2, oil will be drawn from the reservoir through the passages 15 and 15' around the check valve 13 into the cylinder.

At one side of the cylinder is an outlet port 16. This outlet port communicates with an annular channel 17 around a sleeve 18, which sleeve is supported in a housing 19 within the casing 2. There is an annular series of holes 20 establishing communication between the interior of the sleeve 18 and the annular channel 17.

Slidably fitted within the sleeve 18 is a valve member 21 and a rod 22, this valve member preferably having cup rubbers or washers at each end thereof to insure of its having a tight fit in the sleeve 18 at all times. The rod 22 is threaded for a considerable portion of its length. Two nuts 23 are provided near one end of the threaded portion of the rod and two nuts 24 are provided near the other end, the two groups of nuts 23 and 24 being spaced apart. Two nuts are preferably provided so that one will function as a lock nut for the other. These nuts provide spaced apart abutments which are adjustable along the threaded portion of the rod.

Entering the box or casing 2 from the opposite side thereof from the shaft 8 is the rock shaft 25 for the clutch pedal 26. The inner end of this shaft is also supported in the bearing lug 9 inside of the box. Within the box 2 on the shaft 25 is a curved arm 27 somewhat similar to the curved arm 10. Pivotally secured to the free end of this arm 27 by means of a bolt 28 is a link 29, this link having a laterally turned portion 30 with an eye therein through which the rod 22 extends. The eye portion of the link is disposed between the abutments or nuts 23 and 24.

When the clutch pedal is pushed down to declutching position the arm 27 is moved to the left, as viewed in Figures 1 and 2. The link 29 has a free travel between the nuts 23 and 24 until the eye portion 30 thereof engages the abutment 24, when the valve 21 will also be moved to the left. When the valve 21 moves to the left it closes communication from the interior of the cylinder through the port 16, the annular groove 17 and holes 20 to the interior of the casing.

The operation of the mechanism may now be followed. If the brake pedal 12 is depressed to braking position, the piston 5 is moved to the left, as viewed in Figure 2, and oil or fluid from the receptacle 2 is drawn into the cylinder. If the clutch pedal is not operated the valve 21 remains in the position shown in Figure 2, and there is free communication from the interior of the cylinder to the exterior thereof. Consequently, when pressure is released from the brake pedal 12 and the brake pedal moves up over the action of the springs which form a part of the ordinary braking system and which are not here shown, the piston 5 will move to the right, encountering practically no resistance, as the oil within the cylinder will be forced out the port 16, through the openings 20, and back into the casing.

If, however, the clutch pedal has been depressed before the brake is applied, or at the same time the brake is applied, or before the brake has been released, the valve 21 will close the communication between the interior of the cylinder 4 and the interior of the casing, because of the fact that it will have been moved across the ports 20. Therefore if the operator removes his foot from the brake pedal while holding the clutch pedal depressed, the brake cannot release because the fluid in the cylinder 4 will be confined therein.

When the clutch pedal is released from the declutching position, the arm 27 will move to the right, eventually engaging the abutment 23, and push the valve 21 back to the normal position shown in Figure 2, thereby allowing the fluid in the cylinder 4 to escape into the reservoir or chamber 2 and thereby permit the brake to release itself.

The arrangement, of course, is useful in the same connection as the arrangement shown in my said Patent 1,657,356. It permits the operator of a motor vehicle, when the vehicle is starting up a hill from a standing position, to take his foot off the brake pedal and put it on the accelerator while holding the clutch pedal in the de-clutching position. Then, as he allows the clutch pedal to come out to driving position, the brake will release itself. With this arrangement the operator may use that foot which would otherwise be pressing down on the brake pedal to accelerate the engine so that when the brake finally releases the clutch will be engaged, and the engine will have sufficient speed to start up the hill without stalling. The operator can therefore start up a hill from a standing position with less tendency to stall the engine, or with less likelihood of rolling backwards before starting forward, and without having to accelerate the speed of the engine by using the hand throttle.

By reason of the fact that the casing 2 may be filled with oil, there will be a plentiful supply of oil present, and there will be less likelihood of failure of the mechanism to operate through the loss of a small amount of oil than where only sufficient oil is provided in the first place to fill the cylinder as in the arrangement shown in my said patent.

Moreover, the valve 21 is balanced at all times due to the fact that it is completely immersed in oil and due to the fact that the pressure of the oil in the cylinder is equally distributed around the periphery of the valve 21 when the valve is in the brake holding position. Consequently, the valve 21 at all times moves with comparative freedom and allows the clutch pedal to come up easily in the normal way without any sudden jerking. Moreover, when it moves from the position shown in Figure 2 to the position where it closes the cylinder outlet port, the pressures are balanced at each end of the valve and the operator is not conscious of the movement of the valve.

The spaced apart abutments 23 and 24 provide a lost motion between the clutch pedal and the valve 21, allowing a certain freedom of movement of the clutch pedal prior to the operation of the valve. By using spaced apart abutments in the form of adjustable nuts, as shown in Figure 2, the extent of this lost motion can be accurately adjusted to suit the requirements of the particular vehicle to which the device is applied. Obviously it would not be desirable to allow the brake to release just as soon as the clutch pedal starts to move up, but rather, it is desirable that the brake shall release just at the time the clutch begins to take hold. Through the provision of lost motion adjustment between the clutch pedal and the valve 21, the time of the releasing of the brake can be very nicely adjusted to suit the requirements of a particular car. It is of course recognized that all makes of cars do not move the clutch pedal to the same extent.

The arrangement shown in Figure 4 is generally similar to the arrangement shown in Figure 2, with the exception that the balanced valve 21 is eliminated and the clutch pedal instead operates a mechanism which trips the check valve at the end of the cylinder. In this figure the box or casing providing a reservoir for the oil and a housing for the mechanism is designated 32, while 34 is the cylinder, 35 the piston, and 36 the operating yoke with the vertically grooved extensions 37. The rock shaft for the brake is designated 38, and 40 designates the curved arm which is operatively connected to the piston and which corresponds to the arm 10 of the construction shown in Figures 1 to 3. The shank of the brake pedal is designated 41. The shank of the clutch pedal is designated 42 and the clutch rock shaft is indicated at 43. There is a curved arm 44 on this rock shaft corresponding in arrangement to the arm 27 of the construction previously described.

In the end of the cylinder 34 is an inwardly opening check valve 45 having an extension 46 thereon with a spring 47 for urging the check valve to closed position. At 48 is a passageway through which oil from the receptacle 32 can flow in around the check valve into the cylinder 34 when the check valve is open and the piston is moving to the left, and through which oil escaping from the cylinder will flow when the piston is moving in the other direction. The valve extension 46 is provided with a transverse opening 49 through which projects one end of a lever 50, which lever is pivotally supported at 51 on one end of the cylinder. The other end of this lever has an eye 52 therein through which the threaded end of a link 53 passes, this link being pivotally connected to the curved arm 44 as shown. At one side of the lever 50 are a pair of nuts 55 providing an adjustable abutment, which adjustable abutment permits a lost motion between the link 53 and the lever 50 to be varied to meet the requirements of a particular installation.

The operation of this unit is essentially the same as the one previously described except that when the clutch pedal is depressed it will not serve to rock the lever 50, but when the clutch pedal releases the abutment 55 will engage the eye portion 52 of the lever 50, moving the lever 50 in a direction to force the check valve 45 inwardly and release the fluid confined within the cylinder 34.

It will be noted that in Figure 2 both the piston and the valve 21 are shown in the position which they occupy when the clutch is engaged and the brake is released, whereas in Figure 4 the piston 35 occupies the position which it assumes when the brake pedal is depressed, and the abutment 55 is in the position to which it is moved when the clutch pedal is depressed.

The two embodiments specifically illustrated and described are illustrative of my invention and show the advantages of using an external reservoir for the operating fluid over the arrangement show in my said Patent 1,657,356 in which all of the fluid is confined within the cylinder and the passageways communicating therewith.

I claim:

1. In an apparatus of the class described, a cylinder having a piston therein, a fluid containing reservoir in which the cylinder is housed, a check valve which opens into the cylinder by means of which fluid may flow from the reservoir into the cylinder, means operably connecting the piston with the brake mechanism of a vehicle, means operatively connected with the clutch mechanism of a vehicle for controlling the escape of fluid from the cylinder back to the reservoir, said last-named means comprising a sleeve within the reservoir open at each end and having a port intermediate the ends thereof opening into the cylinder, and a reciprocating valve in the sleeve adapted to move back and forth across the port.

2. An apparatus of the class described comprising a casing adapted to provide a fluid reservoir, a cylinder within the casing having a piston therein, means for reciprocating the piston, an inwardly opening check valve for admitting fluid from the reservoir into the cylinder, a sleeve within the reservoir open at each end, an annular series of ports in the sleeve intermediate the ends thereof communicating with a passageway opening into the cylinder, a valve member slidable within the sleeve and adapted to be moved back and forth across said annular series of ports, and operating means for the valve.

3. An apparatus of the class described comprising a casing adapted to provide a fluid reservoir, a cylinder within the casing having a piston therein, means for reciprocating the piston, an inwardly opening check valve for admitting fluid from the reservoir into the cylinder, a sleeve within the reservoir open at each end, an annular series of ports in the sleeve intermediate the ends thereof communicating with a passageway opening into the cylinder, a valve member slidable within the sleeve and adapted to be moved back and forth across said annular series of ports, and operating means for the valve, the actuating means for the valve comprising a rock shaft extending through the casing and having an arm within the casing connected with the valve.

4. An apparatus of the class described comprising a casing adapted to provide a fluid reservoir, a cylinder within the casing having a piston therein, means for reciprocating the piston, an inwardly opening check valve for admitting fluid from the reservoir into the cylinder, a sleeve within the reservoir open at each end, an annular series of ports in the sleeve intermediate the ends thereof communicating with a passageway opening into the cylinder, a valve member slidable within the sleeve and adapted to be moved back and forth across said annular series of ports, operating means for the valve, the actuating means for the valve comprising a rock shaft extending through the casing and having an arm within the casing connected with the valve, and a lost motion adjustment between the said arm and said valve.

5. An apparatus of the class described comprising a casing adapted to provide a fluid reservoir, a cylinder within the casing having a piston therein, means for reciprocating the piston, an inwardly opening check valve for admitting fluid from the reservoir into the cylinder, a sleeve within the reservoir open at each end, an annular series of ports in the sleeve intermediate the ends thereof communicating with a passageway opening into the cylinder, a valve member slidable within the sleeve and adapted to be moved back and forth across said annular series of ports, and operating means for the valve, the actuating means for the valve comprising a rock shaft extending through the casing and having an arm within the casing connected with the valve, the operating means for the piston comprising a rock shaft within the casing and projecting to the outside thereof, said rock shaft having an arm thereon within the casing, said arm being operatively connected with the piston.

6. In an apparatus of the class described, a cylinder having a piston therein, a fluid containing reservoir in which the cylinder is housed, a check valve which opens into the cylinder by means of which fluid may flow from the reservoir into the cylinder, means operably connecting the piston with the brake mechanism of a vehicle, means operatively connected with the clutch mechanism of a vehicle for controlling the escape of fluid from the cylinder back to the reservoir, said last-named means comprising a sleeve within the reservoir open at each end and having a port intermediate the ends thereof opening into the cylinder, and a reciprocating valve in the sleeve adapted to move back and forth across the port, said check valve and means for controlling the escape of fluid from the cylinder to the reservoir also being contained within the fluid reservoir.

7. In combination with the clutch and brake mechanisms of a motor vehicle, a reservoir, a cylinder and piston in the reservoir, a pair of aligned shafts journaled in said reservoir, means connecting one of said shafts to the piston and the brake mechanism, a control valve between the cylinder and reservoir, a connection between the control valve and the other shaft, and a connection between the clutch mechanism and the last named shaft.

8. In combination with the clutch and brake mechanisms of a motor vehicle, a reservoir, a cylinder and piston in the reservoir, a pair of aligned shafts journaled in said reservoir, means connecting one of said shafts to the piston and the brake mechanism, a non-return valve permitting fluid to flow from the reservoir to the cylinder, control means connected to the other shaft for permitting fluid to escape from the cylinder to the reservoir, and a connection between the last named shaft and the clutch mechanism.

LESTER S. GUNDERMAN.